Dec. 4, 1923. 1,475,936
G. R. COULS
TRUCK BODY DUMPING MECHANISM
Filed Aug. 17, 1922   3 Sheets-Sheet 1
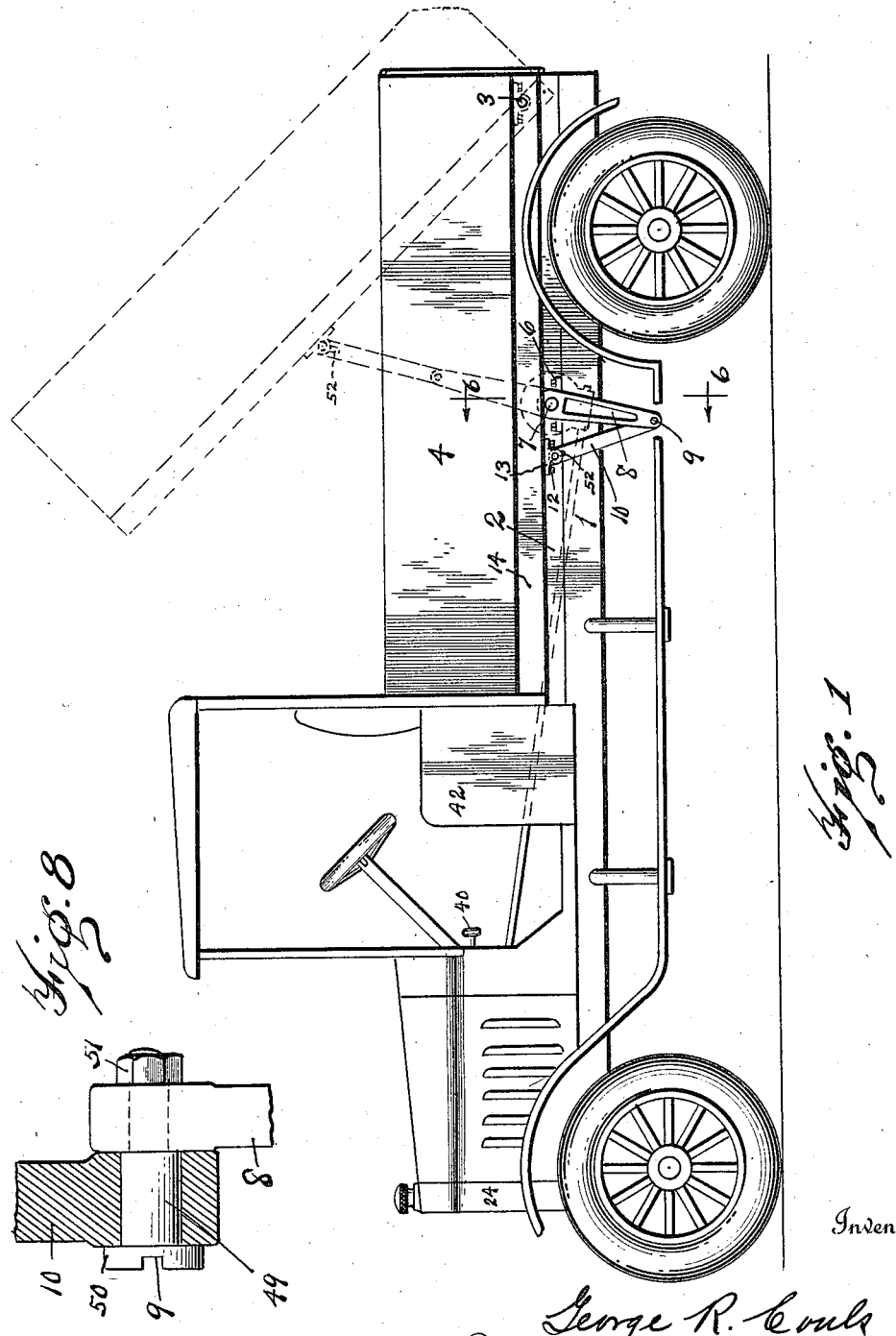

Dec. 4, 1923.
G. R. COULS
1,475,936
TRUCK BODY DUMPING MECHANISM
Filed Aug. 17, 1922   3 Sheets-Sheet 2
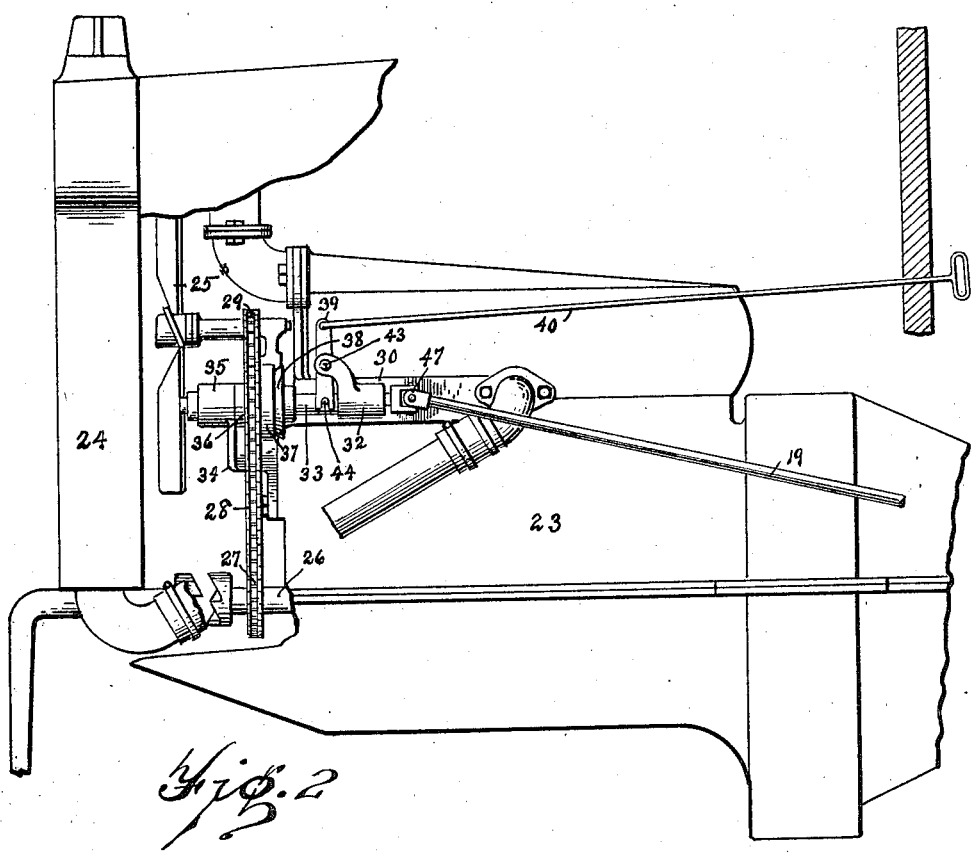
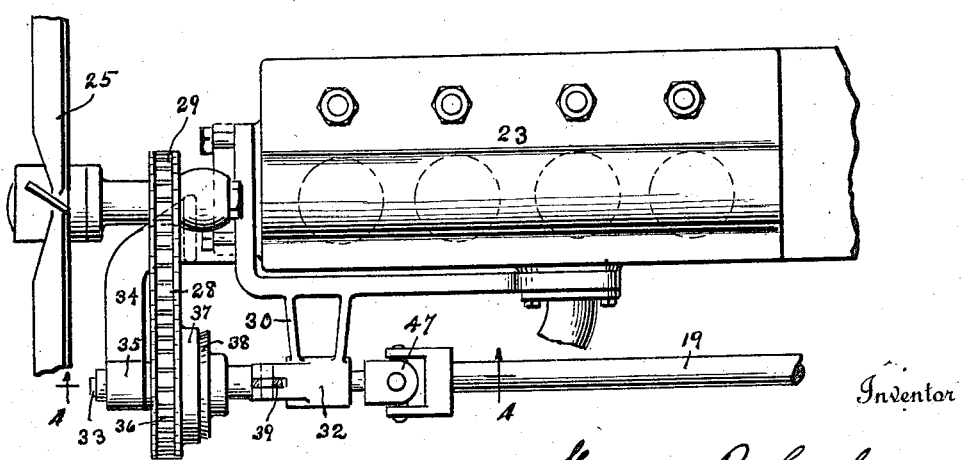

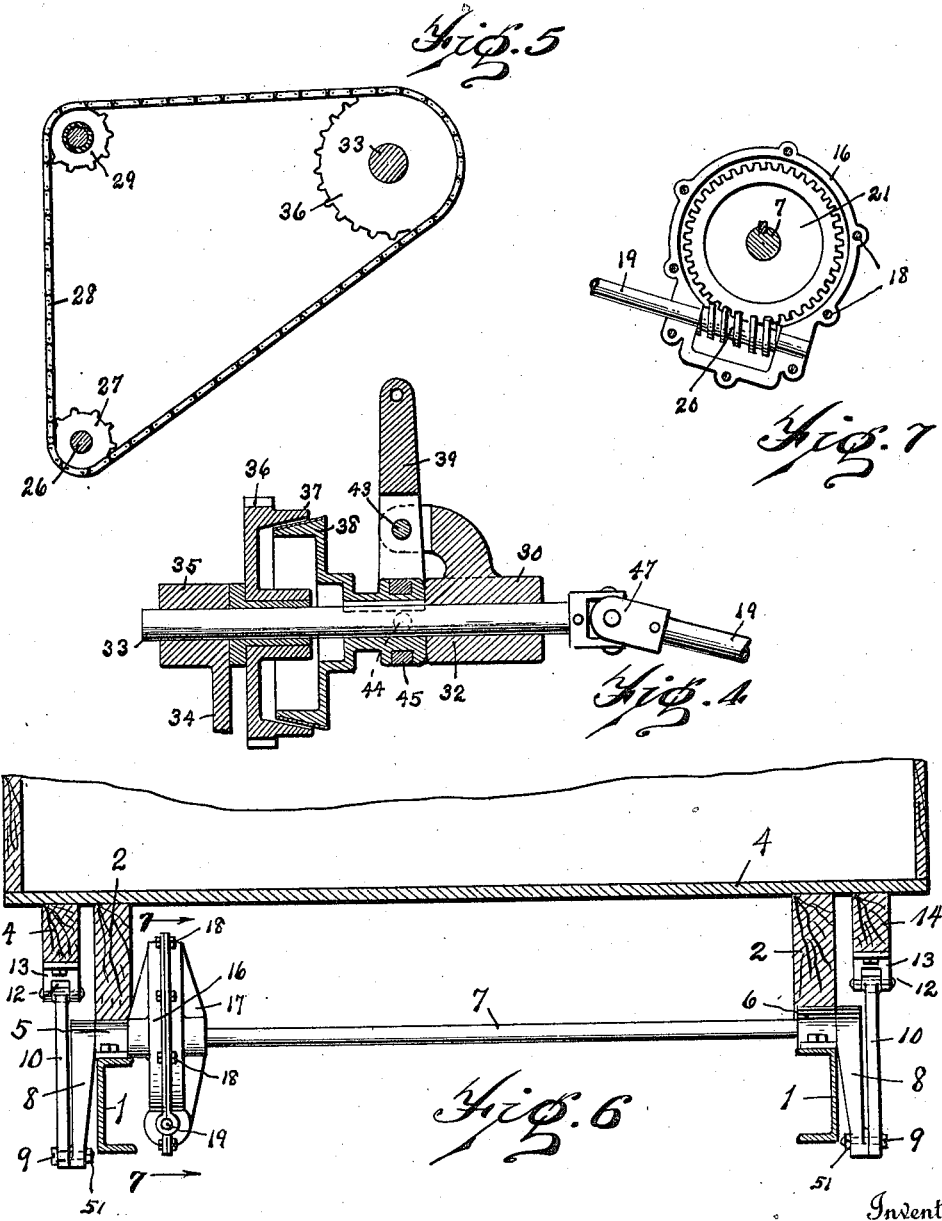

Patented Dec. 4, 1923.

1,475,936

UNITED STATES PATENT OFFICE.

GEORGE R. COULS, OF DETROIT, MICHIGAN.

TRUCK-BODY DUMPING MECHANISM.

Application filed August 17, 1922. Serial No. 582,356.

*To all whom it may concern:*

Be it known that I, GEORGE R. COULS, a citizen of the United States, and residing at Detroit, in the county of Wayne and State of Michigan, have invented a new and Improved Truck-Body Dumping Mechanism, of which the following is a specification.

This invention relates to means for elevating the front ends of truck bodies which are pivoted to the frames of motor vehicles at or near their rear ends, and its object is to provide an operating mechanism of this character which may be connected directly to the engine of the vehicle by means of a simple clutch device and which will always run in the same direction whether for elevating or lowering the truck body and thus avoid the necessity for reversing gear for the dumping mechanism.

A further object of this invention is to provide a dumping mechanism which will be simple in construction and easily installed, and which can be produced at low cost.

In the accompanying drawings, Fig. 1 is a side elevation of a truck provided with my improved dumping mechanism. Fig. 2 is a side elevation of the front portion of the dumping mechanism. Fig. 3 is a plan thereof. Fig. 4 is a section on the line 4—4 of Fig. 3. Fig. 5 is an elevation of a drive chain and the wheels therefor. Fig. 6 is a section on the line 6—6 of Fig. 1. Fig. 7 is a section on the line 7—7 of Fig. 6. Fig. 8 is a detail of a joint between two of the operating members.

Similar reference characters refer to like parts throughout the several views.

The truck shown conventionally in Fig. 1 has side bars 1 on which sleepers 2, preferably of wood, are mounted. Pivots 3 of any desired type are attached at the rear ends of the bars 1 and to the rear end of the body 4 and permit the body to be swung up to the dotted line position shown in Fig. 1. Mounted on these side bars 1 are two bearings 5 and 6 for the tranverse shaft 7, on the ends of which are the crank arms 8 which carry the pins 9 extending through proper holes in the adjacent ends of the links 10. These links are mounted on the pins 12 carried by brackets 13 attached to the sills 14 which are secured to the bottom of the body.

It will be noticed that this shaft may rotate to elevate the body to the dotted line position and then lower it down onto the sleepers 2 without reversing its direction. The means for rotating this shaft may vary to meet the different problems of truck construction. In Figs. 6 and 7 are shown a case consisting of a body 16 attached to the bearing 5 and a cap 17 therefor attached in position by means of bolts 18. Mounted in this case is the rear end of a shaft 19 which carries a worm 20 meshing with the worm wheel 21 attached to the shaft 7. The advantage of a worm and gear structure lies in the fact that it will remain in any desired position without locking.

An engine 23 is mounted on the front end of the frame just behind a radiator 24 and has the usual fan 25 to draw air through the radiator. The engine shaft 26 is shown to extend forward of the engine and is provided with a sprocket wheel 27 instead of the usual fan belt pulley and a driving chain 28 extends around this sproket wheel and around the sprocket wheel 29 connected to the fan 25. A bracket 30 is attached to the engine and supports a bearing 32 for the countershaft 33. If desired, a second bracket 34 may support a second bearing 35 for this shaft. On the shaft 33 is journaled a sprocket wheel 36 having a tapering flange 37 which constitutes one member of a clutch, the other member 38 being splined on the countershaft and movable into and out of driving engagement with the flange 37 by means of a lever 39. A rod 40 extends from any position convenient to the driver's seat 42 to the upper end of this lever which is pivoted at 43 on the bracket 30, and the forked lower end of this lever engages pins 44 carried by the usual collar 45 of the clutch.

As a rule, the countershaft 33 will be parallel to the crankshaft 26 and will not be in alinement with either the top or the bottom of the worm gear 21. It will therefore be found desirable to use a universal coupling 47 to connect the longitudinal shaft 19 to the countershaft. If the countershaft could be so mounted as to be in alinement and integral with the shaft 19 and if proper gearing could be provided for driving this construction from the engine, this universal joint could be omitted. But this dumping mechanism is especially designed for the numerous light trucks now on the market which are not provided with dumping bodies and whose engines are not readily accessible except at the front end. The present construction necessitates no changes in the engine except in the lengths of a few bolts and the substitution of two sprocket gears and a chain for two belt pulleys and a belt.

In order to prevent the body from swaying laterally when hoisted, I prefer to make the joint between the crank arms 8 and the links 10 quite strong. The pin 9, shown in Fig. 8 is formed with a long bearing surface 49 and a head 50 to support the link 10. The pin is rigidly fitted in the crank arm and held in position by the nut 51.

In order to avoid the necessity of very accurate fitting of the dumping mechanism, I prefer to form the upper ends of the links 10 with slots 52 to receive the pins 12. This permits a variance between the top of the side bars 2 and the bottoms of the sills 14 which may readily occur in rough work of this kind.

The details and proportions of this mechanism may all be changed by those skilled in the art without departing from the spirit of my invention as set forth in the following claims.

I claim:—

1. In a truck body dumping mechanism, the combination with a vehicle frame, a body pivoted on the frame, an engine mounted on the frame, a countershaft, extending longitudinally of the body from the front end of the engine to the truck body, a clutch mounted on the front end of the countershaft, a gear loose on the countershaft and adapted to be connected thereto by the clutch, means operatively connecting the gear to the front end of the engine shaft, a transverse shaft journaled on the frame adjacent the body, cranks on the transverse shaft, links pivoted to the ends of the crank arms and to the body, a worm wheel mounted on the transverse shaft, a longitudinal shaft extending from the countershaft to the worm gear, a worm on the longitudinal shaft meshing with the worm gear, and a universal joint connecting the countershaft and longitudinal shaft.

2. In a truck body dumping mechanism, the combination with a vehicle frame, a body pivoted thereon, an engine mounted on the frame and having a shaft extending from one end thereof, a bracket secured to the engine, a countershaft journaled therein, a fan shaft mounted on the engine, sprocket gears attached to the engine shaft and fan shaft and loose on the countershaft, a sprocket chain operatively connecting the gears, a clutch to operatively connect the countershaft to the sprocket gear thereon, a transverse shaft journaled on the frame below the body, crank arms attached to the transverse shaft, links connecting the crank arms to said body to raise and lower the body as the transverse shaft rotates, and operative means connecting the countershaft to the transverse shaft.

3. In a truck body dumping mechanism, the combination with a vehicle frame, a body pivoted thereon, an engine mounted on the frame and having a shaft extending from one end thereof, a bracket secured to the engine, a countershaft journaled therein, a fan shaft mounted on the engine, sprocket gears attached to the engine shaft and fan shaft and loose on the countershaft, a sprocket chain operatively connecting the gears, a clutch to operatively connect the countershaft to the sprocket gear thereon, a transverse shaft journaled on the frame below the body, crank arms attached to the transverse shaft, links connecting the crank arms to said body to raise and lower the body as the transverse shaft rotates, operative means connecting the countershaft to the transverse shaft, said means embodying a case connected to the frame, a worm gear within the case attached to the transverse shaft, a longitudinal shaft journaled in said case, a universal joint connecting the longitudinal shaft to the countershaft, and a worm on the longitudinal shaft meshing with the worm gear.

GEORGE R. COULS.